April 30, 1940. R. H. BERNDT 2,198,755
DEVICE FOR LOCATING AND RECOVERING SUNKEN ARTICLES
Filed May 10, 1938  2 Sheets-Sheet 1
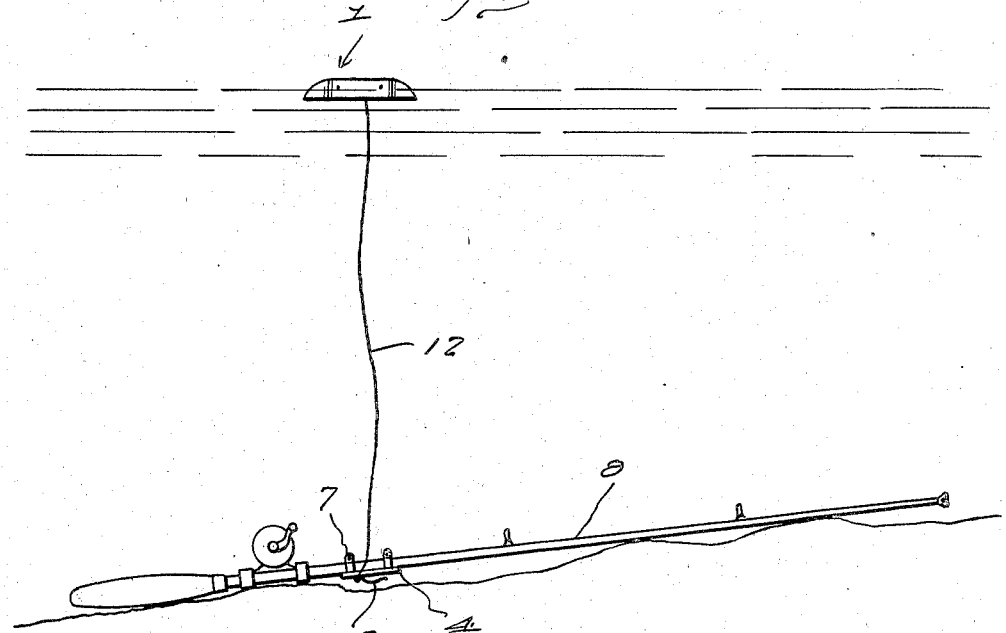
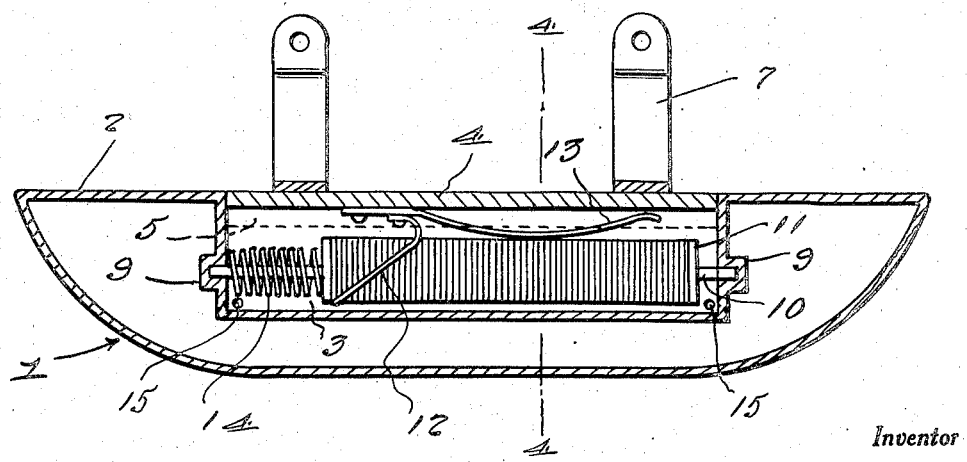
Inventor
R. H. Berndt April 30, 1940. R. H. BERNDT 2,198,755
DEVICE FOR LOCATING AND RECOVERING SUNKEN ARTICLES
Filed May 10, 1938 2 Sheets-Sheet 2
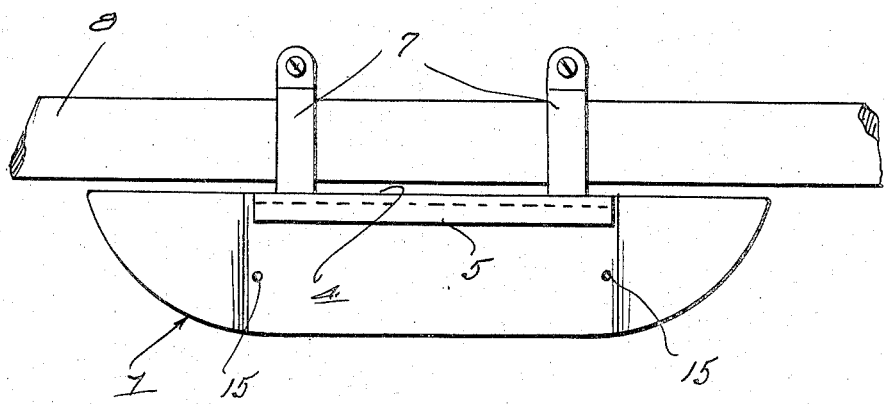
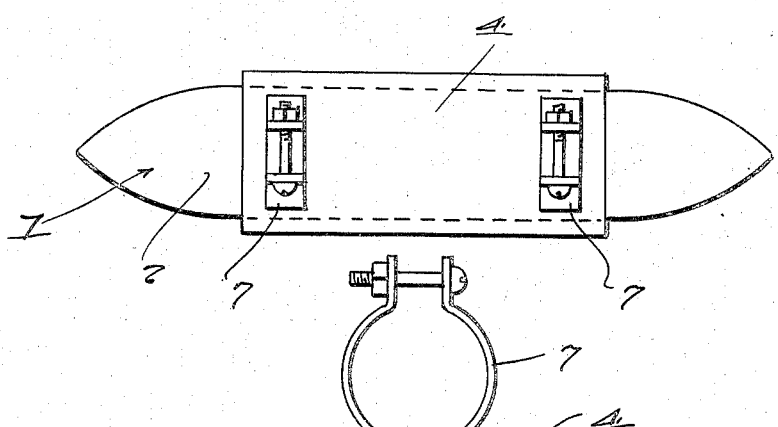
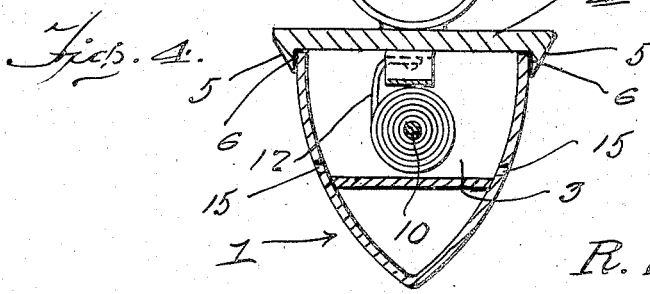
Inventor
R. H. Berndt
By Clarence A. O'Brien
and Hyman Berman
Attorneys Patented Apr. 30, 1940

2,198,755

UNITED STATES PATENT OFFICE 2,198,755

DEVICE FOR LOCATING AND RECOVERING SUNKEN ARTICLES

Ralph H. Berndt, Detroit, Mich.

Application May 10, 1938, Serial No. 207,132

2 Claims. (Cl. 9—8)

The present invention relates to new and useful improvements in devices for locating and recovering sunken articles such as fishing rods, guns, outboard motors, etc., of the type including a float which is adapted to rise to the surface of the water in a manner to indicate the position of the lost object.

An important object of the invention is to provide, in a manner as hereinafter set forth, a device of the aforementioned character embodying novel means for releasably securing the indicating float to the article.

Other objects of the invention are to provide a sunken article locating and recovering device of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing an embodiment of the invention in use on a fishing rod.

Figure 2 is a view in side elevation of the device, showing same before the float is released.

Figure 3 is a top plan view of the invention.

Figure 4 is a cross sectional view, taken substantially on the line 4—4 of Fig. 5.

Figure 5 is a view in vertical longitudinal section through the device.

Referring now to the drawings in detail, it will be seen that the embodiment of the invention which has been illustrated comprises a float of suitable material, such as Bakelite, which is designated generally by the reference numeral 1, said float being of substantially the shape shown to advantage in Figs. 2 and 4 of the drawings. It will be observed that the float 1 includes a substantially flat top 2. Formed in the upper portion of the float 1 is a longitudinally extending well or chamber 3 which is open at its top.

The reference numeral 4 designates an elongated closure plate for the chamber 3. The side walls of the float 2 are recessed to accommodate the plate 4, thus permitting said plate to lay flush with the flat top 2 of said float, as shown to advantage in Fig. 5 of the drawings. The plate 4 comprises depending, bevelled longitudinal side flanges 5 which receive the float 1 therebetween. A soluble glue 6 releasably secures the float 1 to the plate 4. Any suitable means may be provided for permanently mounting the plate 4 on an article or object. In the arrangement illustrated, clamps 7 are provided on the plate 4 for securing said plate to a fishing rod 8.

The end walls of the chamber 3 are provided with bearings 9 in which the end portions of a longitudinal shaft 10 are mounted. Mounted on the shaft 10 is a reel or spool 11. A cord 12 is wound on the spool 11 and has one end secured thereto. The other end of the cord 12 is anchored to the plate 4.

A leaf spring 13 is mounted on the inner side of the closure plate 4 and engaged with the spool of cord in the chamber 3. The purpose of the spring 13 will be presently set forth. Encircling one end portion of the shaft 10 in the chamber 3 is a coil spring 14 which is engaged with the spool 11 for frictionally securing said spool against idle rotation.

It is thought that the operation of the device will be readily apparent from a consideration of the foregoing. The plate 4, with the float 1 secured thereto by the soluble glue or cement 6, is mounted on an article or object, such as the fishing rod 8. Now, should the rod 8 be lost overboard, the water will dissolve the glue 6, thus releasing the float 1 from the plate 4. Ports 15 in the float 1 permit water to enter the chamber 3 to expedite dissolving the glue or cement 6. This permits the spring 13 to function by pushing the float 1 away from or out of engagement with the plate 4. The float 1 then rises to the surface, the string 12 unwinding from the spool 11. Detachment of the float 1 from the plate 4 also disengages the spool of cord from the spring 13, thus permitting unreeling of said cord. The buoyancy of the float 1 is sufficient to unwind the cord 12 on the spool 11 against the frictional resistance of the coil spring 14. When the float 1 rises to the surface of the water it, of course, indicates the position or location of the lost object. Should the lost object be a comparatively light article, such as a fishing rod or a gun, it may be immediately recovered by simply raising it to the surface through the medium of the cord 12. Of course, if the lost object is of considerable weight, such as an outboard motor of a boat, any suitable means may be employed for its recovering after its position or location has been indicated by the float 1.

It is believed that the many advantages of a device constructed in accordance with the present invention will be readily understood and although a preferred embodiment of said device is as illustrated and described, it is to be understood that changes in the details of construction and in the combination and arrangement of parts may be resorted to which will fall within the scope of the invention as claimed.

What is claimed is:

1. A device of the class described comprising a float, said float having a chamber therein, a closure plate for the chamber, means for releasably securing the same to the float, means for attaching the plate to an object, a spool rotatably mounted in the chamber, a flexible strand wound on said spool and having one end anchored to the plate, and a spring mounted on said plate and engaged with the spool, said spring providing means for retaining the spool against rotation in the chamber when the float is secured to the plate and for disengaging said float from said plate when said float is released.

2. A device of the class described comprising a float, said float having a chamber therein, a closure plate for the chamber, means for releasably securing the same to the float, means for attaching said plate to an object, bearings in certain of the walls of the chamber, a shaft having its end portions mounted in said bearings, a spool mounted on said shaft and rotatable in the chamber, a flexible strand wound on said spool and having one end secured thereto, the other end of said flexible strand being anchored to the plate, a leaf spring mounted on the plate and engaged with the spool for disengaging the float from the plate when said float is released, and a coil spring in the chamber encircling the shaft and engaged with one end of the spool for frictionally resisting rotation of said spool.

RALPH H. BERNDT.